(12) United States Patent
Choi et al.

(10) Patent No.: US 11,840,807 B2
(45) Date of Patent: *Dec. 12, 2023

(54) BASE PAPER FOR ECO-FRIENDLY PAPER CUPS

(71) Applicant: Hankuk Paper MFG CO., LTD, Seoul (KR)

(72) Inventors: Ik-Sun Choi, Busan (KR); Hak-Ju Lee, Ulsan (KR); Yoon-Hee Noh, Ulsan (KR); Jong-Soo Kim, Gyeonggi-do (KR)

(73) Assignee: HANKUK PAPER MFG CO., LTD., Seoul (KR)

( * ) Notice: Subject to any disclaimer, the term of this patent is extended or adjusted under 35 U.S.C. 154(b) by 809 days.

This patent is subject to a terminal disclaimer.

(21) Appl. No.: 16/923,611

(22) Filed: Jul. 8, 2020

(65) Prior Publication Data

US 2021/0285157 A1  Sep. 16, 2021

(30) Foreign Application Priority Data

Mar. 16, 2020 (KR) .................. 10-2020-0031855

(51) Int. Cl.

| | |
|---|---|
| D21H 19/20 | (2006.01) |
| D21H 19/82 | (2006.01) |
| D21H 19/84 | (2006.01) |
| B65D 3/06 | (2006.01) |
| B65D 65/42 | (2006.01) |
| B65D 65/46 | (2006.01) |
| B65D 3/14 | (2006.01) |
| D21H 21/16 | (2006.01) |

(Continued)

(52) U.S. Cl.
CPC ............... D21H 19/20 (2013.01); B65D 3/06 (2013.01); B65D 3/14 (2013.01); B65D 65/42 (2013.01); B65D 65/466 (2013.01); D21H 19/824 (2013.01); D21H 19/84 (2013.01); D21H 21/16 (2013.01); *C08K 3/36* (2013.01); *C09D 133/08* (2013.01)

(58) Field of Classification Search
CPC ...... D21H 19/20; D21H 19/824; D21H 19/84; D21H 21/16; C09D 133/08
See application file for complete search history.

(56) References Cited

U.S. PATENT DOCUMENTS

2020/0263359 A1* 8/2020 Zha .................... C09D 7/68

FOREIGN PATENT DOCUMENTS

| KR | 10-2016-00035576 | 3/2016 |
|---|---|---|
| KR | 10-2017-0010980 A | 2/2017 |
| KR | 10-2023160 B1 | 9/2019 |

(Continued)

OTHER PUBLICATIONS

English machine translation for KR20170010980 (Year: 2017).*

(Continued)

*Primary Examiner* — Michael C Miggins
(74) *Attorney, Agent, or Firm* — Harness, Dickey & Pierce, P.L.C.

(57) ABSTRACT

Disclosed is a base paper for eco-friendly paper cups and, more specifically, to a base paper for eco-friendly paper cups, which is eco-friendly by having recyclability and biodegradability while retaining water resistance, oil resistance, heat sealability, and block resistance required as a base paper for paper cups.

20 Claims, 8 Drawing Sheets

(51) Int. Cl.
*C09D 133/08* (2006.01)
*C08K 3/36* (2006.01)

(56) References Cited

FOREIGN PATENT DOCUMENTS

| | | |
|---|---|---|
| WO | WO-2019/094805 A1 | 5/2019 |
| WO | WO-2019/160706 A1 | 8/2019 |

OTHER PUBLICATIONS

International Search Report from corresponding PCT Application No. PCT/KR2020/007088, dated Dec. 14, 2020.
APEC, Ltd, "ACRYCOTE APC-200, Pure Acrylic Emulsion for Paper Coating", Ver. 1.05, Jul. 19, 2017.

* cited by examiner

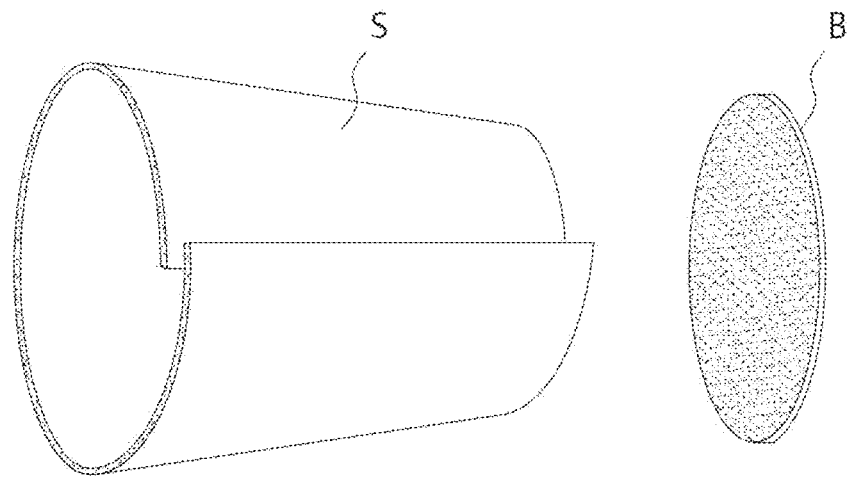
FIG. 2
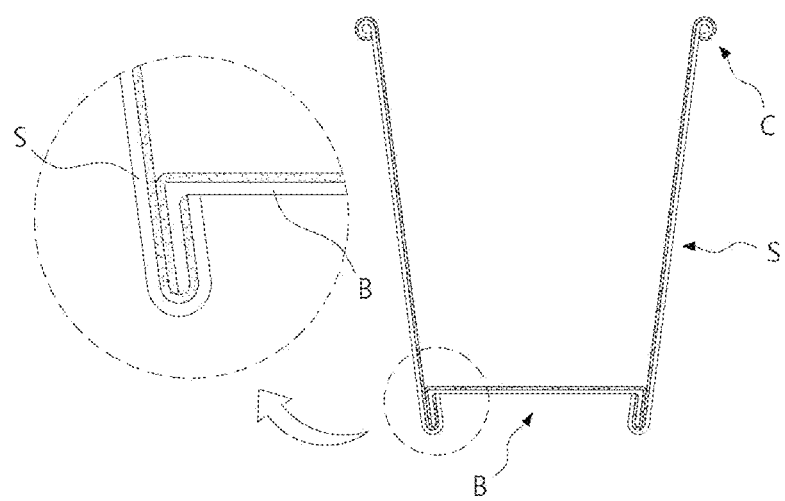

| | Before the test | 2 weeks later | 4 weeks later | 8 weeks later | 6 months later |
|---|---|---|---|---|---|
| Paper | | | | | |
| Example 1-1 | | | | | |
| Comparative Example 1-4 | | | | | |
| Comparative Example 1-5 | | | | | |

BASE PAPER FOR ECO-FRIENDLY PAPER CUPS

CROSS-REFERENCE TO RELATED APPLICATIONS

This application claims priority to Korean Application No. 10-2020-0031855, filed Mar. 16, 2020, the entire contents of which is incorporated herein by specific reference.

BACKGROUND OF THE INVENTION

1. The Field of the Invention

The present disclosure relates to a base paper for eco-friendly paper cups and, more specifically, to a base paper for eco-friendly paper cups, which is eco-friendly by having recyclability and biodegradability while retaining water resistance, oil resistance, heat sealability, and block resistance required as a base paper for paper cups.

2. The Relevant Technology

To manufacture paper cups, the surface of a paper needs to be coated with a material having barrier characteristics and heat sealability.

According to one of the most widely used methods for manufacturing general-purpose paper cups, the surface of a paper is coated with polyethylene (PE) melted by the T-die process.

Polyethylene (PE) is one of the most widely used coating materials for paper cups. Polyethylene (PE) has barrier characteristics as well enables heat sealing between a coated surface and a paper and heat sealing between a coated surface and a coated surface, and thus retains optimal characteristics for manufacturing paper cups.

However, polyethylene (PE) is not degradable in nature and needs to be subjected to a separate removal process in re-pulping for recycling the pulp used in paper cups, and actually, more than 90% of paper cups are discarded without being collected.

Therefore, attempts have been made to manufacture eco-friendly paper cups by coating a paper with a material other than polyethylene (PE) in related industries.

A representative form of eco-friendly paper cups that are currently commercialized is a coated paper cup using polylactic acid (PLA). Due to the facts that polylactic acid (PLA) is a polymer prepared from naturally occurring materials rather than petroleum-based compounds and polylactic acid (PLA) is biodegradable in particular conditions, the related industries claim that paper cups manufactured using polylactic acid are eco-friendly paper cups.

However, polylactic acid (PLA) is a polymer that is not degraded in nature but degraded in only particular conditions, and thus is generally not biodegraded in a buried state. Moreover, in an aspect of recycling of resources, the polylactic acid (PLA) coating actually has more difficulty in pulp recovery than the polyethylene (PE) coating, and thus it is unreasonable to conclude that paper cups coated with polylactic acid (PLA) are eco-friendly paper cups.

A base paper needs to have recyclability and biodegradability in order to manufacture eco-friendly paper cups, but if the base paper focuses on such characteristics, the base paper may not ensure water resistance, workability, and the like, which a base paper for paper cups should fundamentally retain.

FIG. 1 shows a conventional process for manufacturing a paper cup. Referring to FIG. 1, as for a typical process for manufacturing a paper cup, a base paper for paper cups is cut along the development drawing of a paper cup, and then as shown in FIG. 1, a side paper S portion of the cut base paper, which constitutes the side surface S of a paper cup, is rolled as shown in the drawing and both ends of the side paper S are connected together.

Since a coated surface for ensuring water resistance of a paper cup is formed on the base paper for paper cups, the coated surface is sealed to a non-coated surface when the side paper S is rolled to connect both ends, and therefore, there needs to be excellent heat sealability between the coated surface and the non-coated surface.

When the side paper S is rolled in a cylindrical shape by the sealing between the coated surface and the non-coated surface, a bottom paper B constituting the bottom surface of the paper cup is prepared, and the bottom paper B is sealed to the bottom side of the side paper S rolled in a cylindrical shape. In this process, the bottom paper B is sealed to the side paper S while being folded as shown in FIG. 2, and thus the sealing between a coated surface and a coated surface as well as the sealing between a coated surface and non-coated surface is required to be excellent.

Ultimately, in order to realize fundamental characteristics of a paper cup that contains a liquid or the like, it is important to form a coated surface for expressing water resistance on a base paper for paper cups and, furthermore, excellent heat sealability between a coated surface and a non-coated surface and between a coated surface and a coated surface is required.

However, as described above, even in a situation where excellent heat sealability is required, excessive heat sealability may be a factor that makes a paper cup manufacturing process difficult. The reason is as follows. The paper cup under manufacture, of which the side paper S and bottom paper B have been subjected to sealing, is rotated while being put on a mold, and the manufacturing apparatus presses the upper portion of the rotating paper cup to form a curling portion C in FIG. 2. In this process, if the heat sealability of the paper cup is higher than necessary, the sticking occurs between the coated surface of the paper cup and the mold, resulting in a poor separation of the paper cup from the mold after the formation of the curling portion C. When the paper cup under manufacture is not separated from the mold on time, an operation for forming the curling portion C may be stopped, ultimately causing a failure in the whole operation process. Moreover, the base papers stacked for manufacturing paper cups may stick to each other, and when finished paper cups are staked, the stacked paper cups may stick to each other.

Although conventional techniques of employing acrylic-based copolymer resins facilitated the design of coating layers having heat sealability, block resistance opposed to heat sealability was needed in an actual paper cup molding process, and therefore, it was difficult to satisfy both the two properties in a single layer.

As described above, a base paper for paper cups needs to have not only excellent water resistance and oil resistance of coated surfaces but also heat sealability and block resistance, and therefore, a base paper for eco-friendly paper cups needs to be provided to fundamentally satisfy these characteristics and additionally needs to have recyclability and biodegradability. It was not easy to manufacture a base paper that can satisfy all the above-described performances, and any one performance was not satisfied when another performance was satisfied.

The demand in related industries for a base paper for eco-friendly paper cups is gradually growing due to resource depletion and environmental pollution, but even though conventional base papers released as a base paper for eco-friendly paper cups are said to be recyclable, actual re-pulping thereof was not smoothly performed and most of the discarded paper cups were not degraded even after six months. Moreover, conventional base papers did not have even basic requirements as a base paper for paper cups. Therefore, the present applicant has lead to the development of a base paper for paper cups, which are eco-friendly while having basic characteristics as a base paper of paper cups.

PRIOR ART DOCUMENT

Patent Document

Korean Patent Publication No. 10-2016-0035576 (31 Mar. 2016).

SUMMARY OF THE INVENTION

The present disclosure has been made in order to solve the above-mentioned problems in the prior art.

An aspect of the present disclosure is to provide a base paper for eco-friendly paper cups, which has good workability due to excellent heat sealability, water resistance, and block resistance, enables the re-pulping of used paper cups, and is naturally degraded when exposed to soil or air.

Another aspect of the present disclosure is to provide a base paper for eco-friendly paper cups, which, by a double-coating layer formed on a basic paper, increases heat sealability between a coated surface and a coated surface and heat sealability between a coated surface and a non-coated surface to ensure water resistance and oil resistance of paper cups, increases block resistance between a coated surface and a non-coated surface to facilitate the separation of paper cups under manufacture from a mold or to cause no sticking between stacked base papers or between finished paper cups, while the base paper for eco-friendly cups is eco-friendly.

Still another aspect of the present disclosure is to provide a base paper for eco-friendly paper cups, which is easily molded into paper cups, causes no water leakage, has no problem in use due to a coated surface of paper cups being harmless to the human body, and is recyclable even without a separate film removal process performed on used paper cups.

Still another aspect of the present disclosure is to provide a base paper for eco-friendly paper cups, which ensures excellent heat sealability and water resistance through a first coating layer by applying a first coating liquid on a basic paper to form the first coating layer.

Still another aspect of the present disclosure is to provide a base paper for eco-friendly paper cups, which ensures excellent block resistance through a second coating layer by applying a second coating liquid on a first coating layer to form the second coating layer.

Still another aspect of the present disclosure is to provide a base paper for eco-friendly paper cups, which enables heat sealing even at a low temperature by preparing a first coating liquid from a first resin having a relatively low glass transition temperature.

Still another aspect of the present disclosure is to prevent bubbling and remove bubbles by adding a first defoamer to a first resin when a first coating liquid is prepared.

Still another aspect of the present disclosure is to prevent rapid deteriorations in water resistance and oil resistance of paper cups by adjusting the coating amount of a first coating liquid applied on a basic paper to be more than 7 $g/m^2$, to increase the recyclability of the base paper by adjusting the coating amount of the first coating liquid to be less than 18 $g/m^2$, and to prevent a rise in price of a base paper resulting from an increase in coating amount of the first coating liquid. Still another aspect of the present disclosure is to increase block resistance of a base paper through a second layer by preparing a second coating liquid from a second resin having a relatively high glass transition temperature and applying the second coating liquid onto a first coating layer to form the second coating layer on the first coating layer.

Still another aspect of the present disclosure is to prevent bubbling and remove bubbles by adding a second defoamer to a second resin when a second coating liquid is prepared.

Still another aspect of the present disclosure is to provide surface stickiness by adding silica when a second coating liquid is prepared.

Still another aspect of the present disclosure is to prevent a rapid deterioration in block resistance between a coated surface and a non-coated surface by adjusting the amount of silica added to be more than 0.06 parts by weight relative to the second resin when a second coating liquid is prepared, and to prevent heat sealability between a coated surface and a coated surface, heat sealability between a coated surface and a non-coated surface, water resistance to hot water, and water resistance to cold water from being out of normal ranges by adjusting the amount of silica added to be less than 0.21 parts by weight relative to the second resin.

Still another aspect of the present disclosure is to prevent coating liquid agglomeration due to a difference in surface tension to thereby uniformly apply a second coating liquid onto the entire surface of a first coating layer by adding a wetting agent when the second coating liquid is prepared.

Still another aspect of the present disclosure is to prevent a deterioration in block resistance between a coated surface and a non-coated surface by adjusting the amount of a wetting agent to be more than 0 parts by weight relative to a second resin when a second coating liquid is prepared, and to prevent a rise in manufacturing cost resulting from the excessive addition of the wetting agent while preventing deteriorations in water resistance in hot water and recyclability by adjusting the amount of the wetting agent to be less than 0.02 parts by weight relative to the second resin.

Still another aspect of the present disclosure is to prevent a rapid deterioration in block resistance between a coated surface and a non-coated surface by adjusting the coating amount of a second coating liquid applied onto a first coating layer to be more than 1 $g/m^2$, and to prevent heat sealability between a coated surface and a non-coated surface from being out of a normal range by adjusting the coating amount of the second coating liquid to be less than 5 $g/m^2$.

Still another aspect of the present disclosure is to lower the production cost of a base paper by forming a double-coating layer including a first coating layer and a second layer on only one surface of a basic paper.

Still another aspect of the present disclosure is to enable the use of a base paper having a double-coating layer formed on both surfaces of a basic paper in cases where it is important to secure water resistance and oil resistance of paper cups, by forming a double-coating layer including a first coating layer and a second coating layer on both surfaces of the basic paper.

Still another aspect of the present disclosure is to enable the production of paper cups with excellent product quality while lowering the production cost of paper cups, by using, as a side paper of a paper cup, a base paper having a double-coating layer formed on only one surface of a basic paper and using, as a bottom paper of the paper cup, a base paper having a double-coating layer formed on both surfaces of the basic paper.

The present disclosure is implemented by embodiments having the following configuration in order to attain the above aspects.

Accordance an embodiment of the present disclosure, there is provided a base paper for eco-friendly paper cups, including: a basic paper; and a double-coating layer formed on the basic paper, wherein the base paper for eco-friendly paper cups has heat sealability and block resistance, facilitates recycling, and is biodegradable in nature.

According to another embodiment of the present disclosure, the double-coating layer may includes: a first coating layer formed of a first coating liquid applied onto the basic paper; and a second coating layer formed of a second coating liquid applied onto the first coating layer.

According to still another embodiment of the present disclosure, the double-coating layer may be given heat sealability by the first coating layer and given block resistance by the second coating layer.

According to still another embodiment of the present disclosure, the first coating liquid may include a first resin for giving heat sealability and a first defoamer for removing bubbles.

According to still another embodiment of the present disclosure, the first resin may have a glass transition temperature lower than a temperature during the manufacturing of paper cups and thus give heat sealability to the base paper for paper cups.

According to still another embodiment of the present disclosure, the first resin may be an aqueous copolymer latex, which is prepared by the emulsion polymerization of a monomer mixture containing an acrylic-based monomer and a carboxylic acid-based monomer in the presence of a reactive emulsifier and a multifunctional silicone polymer and contains repeating units derived from the acrylic-based and carboxylic acid-based monomers in a proportion of 80% or more relative to the total repeating units, the first resin having a solid content of 46.5 wt %, a glass transition temperature (Tg) of 3° C., and a minimum film forming temperature (METT) of 32° C.

According to still another embodiment of the present disclosure, the first deformer may be added in 0.002 parts by weight relative to the first resin.

According to still another embodiment of the present disclosure, the coating amount (g/m$^2$) of the first coating liquid may be more than 7 g/m$^2$ and less than 18 g/m$^2$.

According to still another embodiment of the present disclosure, the second coating liquid may include a second resin for giving block resistance, a second defoamer for removing bubbles, silica for preventing surface stickiness, and a wetting agent for improving coating coverage.

According to still another embodiment of the present disclosure, the second resin may have a glass transition temperature higher than a temperature during the manufacturing of paper cups and thus give block resistance to the base paper for eco-friendly paper cups.

According to still another embodiment of the present disclosure, the second resin may be an aqueous copolymer latex, which is prepared by the emulsion polymerization of a monomer mixture containing an acrylic-based monomer and a carboxylic acid-based monomer in the presence of a reactive emulsifier and a multifunctional silicone polymer and contains repeating units derived from the acrylic-based and carboxylic acid-based monomers in a proportion of 80% or more relative to the total repeating units, the second resin having a solid content of 45.7 wt %, a glass transition temperature (Tg) of 22° C., and a minimum film forming temperature (METT) of 20° C.

According to still another embodiment of the present disclosure, the second deformer may be added in 0.002 parts by weight relative to the second resin.

According to still another embodiment of the present disclosure, the silica may be added in more than 0.05 parts by weight and less than 0.21 parts by weight relative to the second resin.

According to still another embodiment of the present disclosure, the wetting agent may be added in more than 0 parts by weight and less than 0.02 parts by weight relative to the second resin.

According to still another embodiment of the present disclosure, the coating amount (g/m$^2$) of the second coating liquid may be more than 1 g/m$^2$ and less than 5 g g/m$^2$.

According to still another embodiment of the present disclosure, the double-coating layer may be formed on one surface of the basic paper.

According to still another embodiment of the present disclosure, the double-coating layer may be formed on both surfaces of the basic paper.

According to still another embodiment of the present disclosure, the first resin of the first coating layer may exhibit heat sealability at 80-150° C. and the second resin of the second coating layer may exhibit block resistance at 80-120° C.

According to still another embodiment of the present disclosure, the temperature at which the first resin exhibits heat sealability may be higher than the temperature at which the second resin exhibits block resistance.

According to still another embodiment of the present disclosure, the first resin may exhibit heat sealability at 80-145° C. in the sealing between a coated surface and a coated surface.

According to still another embodiment of the present disclosure, the first resin may exhibit heat sealability at approximately 115° C.

According to still another embodiment of the present disclosure, the first resin may exhibit heat sealability at 90-150° C. in the sealing between a coated surface and a non-coated surface.

According to still another embodiment of the present disclosure, the first resin may exhibit heat sealability at approximately 130° C.

According to still another embodiment of the present disclosure, the second resin may exhibit block resistance at 90-120° C. in the sealing between a coated surface and a non-coated surface.

According to still another embodiment of the present disclosure, the second resin may exhibit block resistance at approximately 100° C.

The present disclosure can give the following effects by the above embodiments, configurations, combinations, and usage relationships, which will be described below.

The present disclosure derives the effect of providing a base paper for eco-friendly paper cups, which has good workability due to excellent heat sealability, water resistance, and block resistance, enables the re-pulping of used paper cups, and is naturally degraded when exposed to soil or air.

The present disclosure derives the effect of providing a base paper for eco-friendly paper cups, which, by a double-coating layer formed on a basic paper, increases heat sealability between a coated surface and a coated surface and heat sealability between a coated surface and a non-coated surface to ensure water resistance and oil resistance of paper cups, increases block resistance between a coated surface and a non-coated surface to facilitate the separation of paper cups under manufacture from a mold or to cause no sticking between stacked base papers or between finished paper cups, while the base paper for eco-friendly cups is eco-friendly.

The present disclosure derives the effect of providing a base paper for eco-friendly paper cups, which is easily molded into paper cups, causes no water leakage, has no problem in use due to a coated surface of paper cups being harmless to the human body, and is recyclable even without a separate film removal process performed on used paper cups.

The present disclosure derives the effect of providing a base paper for eco-friendly paper cups, which ensures excellent heat sealability and water resistance through a first coating layer by applying a first coating liquid on a basic paper to form the first coating layer.

The present disclosure derives the effect of providing a base paper for eco-friendly paper cups, which ensures excellent block resistance through a second coating layer by applying a second coating liquid on a first coating layer to form the second coating layer.

The present disclosure derives the effect of providing a base paper for eco-friendly paper cups, which enables heat sealing even at a low temperature by preparing a first coating liquid from a first resin having a relatively low glass transition temperature.

The present disclosure derives the effect of preventing bubbling and removing bubbles by adding a first defoamer to a first resin when a first coating liquid is prepared.

The present disclosure derives the effect of preventing rapid deteriorations in water resistance and oil resistance of paper cups by adjusting the coating amount of a first coating liquid applied on a basic paper to be more than 7 $g/m^2$, increasing the recyclability of the base paper by adjusting the coating amount of the first coating liquid to be less than 18 $g/m^2$, and preventing a rise in price of a base paper resulting from an increase in coating amount of the first coating liquid.

The present disclosure derives the effect of increasing block resistance of a base paper through a second layer by preparing a second coating liquid from a second resin having a relatively high glass transition temperature and applying the second coating liquid onto a first coating layer to form the second coating layer on the first coating layer.

The present disclosure derives the effect of preventing bubbling and removing bubbles by adding a second defoamer to a second resin when a second coating liquid is prepared.

The present disclosure derives the effect of providing surface stickiness by adding silica when a second coating liquid is prepared.

The present disclosure derives the effect of preventing a rapid deterioration in block resistance between a coated surface and a non-coated surface by adjusting the amount of silica added to be more than 0.06 parts by weight relative to the second resin when a second coating liquid is prepared, and preventing heat sealability between a coated surface and a coated surface, heat sealability between a coated surface and a non-coated surface, water resistance to hot water, and water resistance to cold water from being out of normal ranges by adjusting the amount of silica added to be less than 0.21 parts by weight relative to the second resin.

The present disclosure derives the effect of preventing coating liquid agglomeration due to a difference in surface tension to thereby uniformly apply a second coating liquid onto the entire surface of a first coating layer by adding a wetting agent when the second coating liquid is prepared.

The present disclosure derives the effect of preventing a deterioration in block resistance between a coated surface and a non-coated surface by adjusting the amount of a wetting agent to be more than 0 parts by weight relative to a second resin when a second coating liquid is prepared, and preventing a rise in manufacturing cost resulting from the excessive addition of the wetting agent while preventing deteriorations in water resistance in hot water and recyclability by adjusting the amount of the wetting agent to be less than 0.02 parts by weight relative to the second resin.

The present disclosure derives the effect of preventing a rapid deterioration in block resistance between a coated surface and a non-coated surface by adjusting the coating amount of a second coating liquid applied onto a first coating layer to be more than 1 $g/m^2$, and preventing heat sealability between a coated surface and a non-coated surface from being out of a normal range by adjusting the coating amount of the second coating liquid to be less than 5 $g/m^2$.

The present disclosure derives the effect of lowering the production cost of a base paper by forming a double-coating layer including a first coating layer and a second layer on only one surface of a basic paper.

The present disclosure has the effect of enabling the use of a base paper having a double-coating layer formed on both surfaces of a basic paper in cases where it is important to secure water resistance and oil resistance of paper cups, by forming a double-coating layer including a first coating layer and a second coating layer on both surfaces of the basic paper.

The present disclosure derives the effect of enabling the production of paper cups with excellent product quality while lowering the production cost of paper cups, by using, as a side paper of a paper cup, a base paper having a double-coating layer formed on only one surface of a basic paper and using, as a bottom paper of the paper cup, a base paper having a double-coating layer formed on both surfaces of the basic paper.

BRIEF DESCRIPTION OF THE DRAWINGS

The above and other aspects, features and advantages of the present disclosure will be more apparent from the following detailed description taken in conjunction with the accompanying drawings, in which:

FIG. 1 shows a conventional process for manufacturing a paper cup;

FIG. 2 shows a cross-section of a paper cup;

DETAILED DESCRIPTION OF THE PREFERRED EMBODIMENTS

Hereinafter, preferable embodiments of a base paper for eco-friendly paper cups and a method for manufacturing the same according to the present disclosure will be described in detail with reference to the accompanying drawings. In the following description, a detailed description of known functions and configurations incorporated herein will be omitted when it is determined that the detailed description may obscure the subject matter of the present disclosure. Unless particularly defined otherwise, all terms used in the present specification are the same as general meanings of the terms understood by those skilled in the art, and if the terms used in the present specification conflict with general meanings of the corresponding terms, the meanings of the terms comply with the meanings defined in the present specification.

Figure 3:
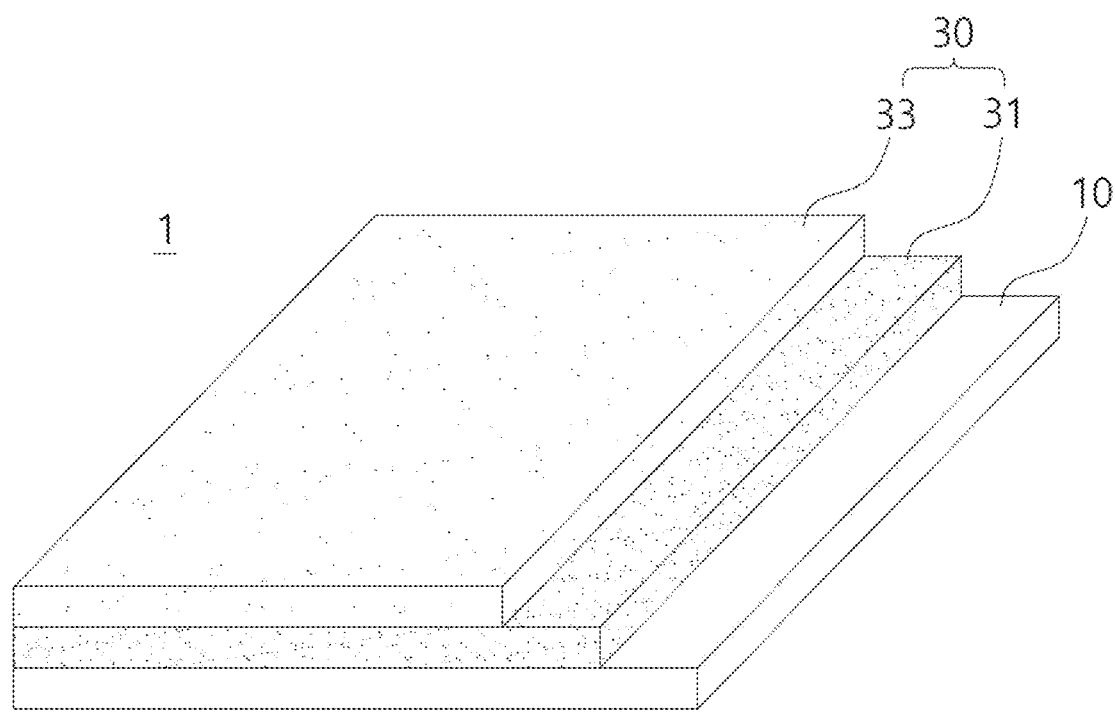
FIG. 3 shows a base paper for eco-friendly base cups according to an embodiment of the present disclosure.

A base paper 1 for eco-friendly paper cups of the present disclosure, which is a base paper used in the manufacturing of paper cups, has eco-friendly characteristics through recyclability and biodegradability while satisfying both processability characteristics and use characteristics required as a base paper in the manufacturing of paper cups. FIG. 3 shows a base paper for eco-friendly paper cups according to an embodiment of the present disclosure. Referring to FIG. 3, the base paper 1 for eco-friendly paper cups includes a basic paper 10 and a double-coating layer 30.

The basic paper 10 is a basic paper on which the double-coating layer 30 to be later described is formed, and may be regarded as a collective term of all types of papers that can be used in the manufacturing of paper cups. The basic paper 10 is not limited to any particular type of paper, but the basic paper 10 has preferably a basis weight in the range of 180-380 g/m² and may be a KAce PNC product by Hankuk Paper Co., Ltd., which is manufactured using 100% natural pulp without fluorescent materials.

Figure 4:
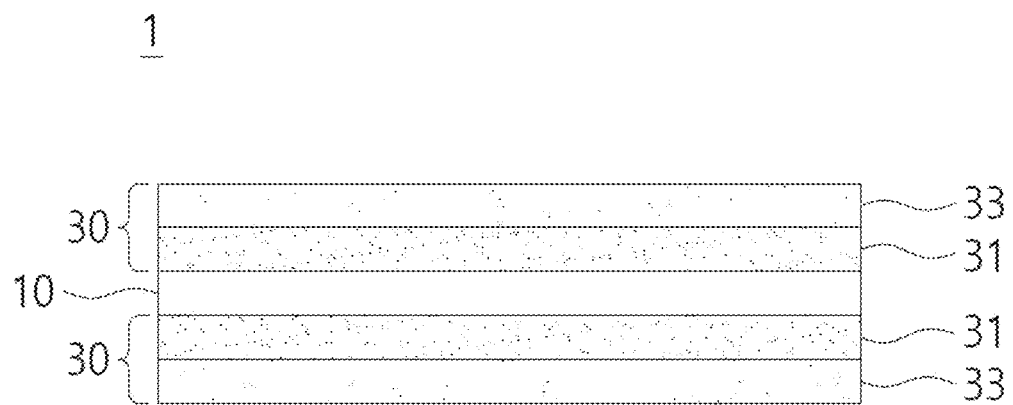
FIG. 4 shows a base paper for eco-friendly paper cups according to another embodiment of the present disclosure.

The double-coating layer 30 is formed on the basic paper 10. The double-coating layer 30 may be formed on only one surface of the basic paper 10 as shown in FIG. 3, and may be formed on both surfaces of the basic paper 10 as shown in FIG. 4. In addition, a base paper 1 in which the double-coating layer 30 is formed on only one surface of the basic paper 10 and a base paper 1 in which the double-coating layer 30 is formed on both surfaces of the basic paper 10 are separately manufactured, so that the base paper 1 having the double-coating layer 30 formed on only one surface of the basic paper 10 may be used as a side paper of paper cups and the base paper 1 having the double-coating layer 30 formed on both surfaces of the basic paper 10 may be used as a bottom paper of paper cups. The double-coating layer 30 includes a first coating layer 31 and a second coating layer 33.

The first coating layer 31 is a coating layer formed on the basic paper 10. The coating layer 31 may be a coating layer, which is formed on the basic paper 10 by applying a predetermined amount of a first coating liquid onto the basic paper 10. The base paper for paper cups is given heat sealability, water resistance, oil resistance, and the like by the first coating layer 31. As for the heat sealability by the first coating layer 31, the heat sealing temperature between a coated surface and a coated surface may be 80-145° C. and preferably 115° C. As for the heat sealability by the first coating layer 31, the heat sealing temperature between a coated surface and a non-coated surface may be 90-150° C., and preferably 130° C. Such numerical values were derived through Experiment 1 to be later described. The first coating liquid is prepared from a first resin and a first defoamer, and the coating amount (g/m²) of the first coating liquid applied onto the basic paper 10 may be preferably more than 7 g/m² and less than 18 g/m². The range of the coating amount (g/m²) of the first coating liquid will be later described in detail.

The first resin is an aqueous copolymer latex, which is prepared by the emulsion polymerization of a monomer mixture containing an acrylic-based monomer and a carboxylic acid-based monomer in the presence of a reactive emulsifier and a multifunctional silicone polymer and contains repeating units derived from the acrylic-based and carboxylic acid-based monomers in a proportion of 80% or more relative to the total repeating units, and the first resin has a solid content of 46.5 wt %, a glass transition temperature (Tg) of 3° C., and a minimum film forming temperature (MFFT) of 32° C. Preferably, the first resin is ACRY-COTE™ APC-200 from APEC Inc., and may contain 46-47 wt % of an acrylate copolymer modified polymer resin, 52.9-53.9 wt % of water, and 0.1 wt % of other components.

The term "glass transition temperature (Tg)" refers to a temperature at which a polymer material changes from a rigid glassy state into a rubber phase when the polymer material is heated, that is, glass transition occurs.

The first resin has a low glass transition temperature (Tg), preferably a glass transition temperature lower than a temperature in the manufacturing of paper cups, and thus the first resin shows high heat sealability but, low block resistance. Therefore, even though paper cups are manufactured at low temperatures, the sticking may be caused between a mold and the base paper for paper cups, and thus the paper cups under production may not be separated from the mold in time. Moreover, the base papers stacked for the manufacturing of paper cups may stick to each other and the stacked paper cups stick to each other when finished paper cups are staked.

Accordingly, the present disclosure provides a base paper 1 for paper cups, which is supplemented with block resistance by the second coating layer 33 to be later described while showing heat sealability and water resistance increased by the first coating layer 31.

The first resin exhibits heat sealability at 80-150° C., and the temperature at which the first resin exhibits heat sealability is higher than the temperature at which the second resin to be later exhibits block resistance. Preferably, the first resin exhibits heat sealability at 80-145° C., and more preferably approximately 115° C. in the sealing between a coated surface and a coated surface. In addition, the first resin exhibits heat sealability at 90-150° C., and more preferably approximately 130° C. in the sealing between a coated surface and a non-coated surface.

The first defoamer is used to prevent bubbling and remove bubbles, and preferably, the amount of the defoamer added may be 0.002 parts by weight when the amount of the first resin is set to 1. More preferably, the first defoamer is a silicone-based defoamer containing polydimethylsiloxane (PDMS) as a main raw material, produced by Sadhan Silichem Co., Ltd., and may be a white suspension containing a solid content of 38 wt % and a pH level of 7.0. More preferably, the first defoamer may be FD-330 from Sadhan Silichem Co., Ltd., which contains 1-5 wt % of sorbitan monostearate, 30 wt % of polydimethylsiloxane, 55-65 wt % of water, 1 wt % of sodium carboxymethyl cellulose, and 5-10 wt % of Sorbitan, trioctadecanoate, poly(oxy-1,2-ethanediyl) derivs.

The second coating layer 33 is a coating layer formed on the first coating layer 31. The second coating layer 33 may be a coating layer, which is formed on the first coating layer 31 by applying a predetermined amount of a second coating liquid onto the first coating layer 31. The base paper for paper cups is given block resistance by the second coating layer 33. As for the block resistance by the second coating layer 33, the heat sealing temperature between a coated surface and a non-coated surface may be 90-120° C., and preferably 100° C. Such numerical values were derived through Experiment 1 to be later described. The second coating liquid is prepared from a second resin, a second defoamer, silica, and a wetting agent, and the coating amount ($g/m^2$) of the second coating liquid applied onto the first coating layer 31 may be preferably more than 1 $g/m^2$ and less than 5 $g/m^2$. The range of the coating amount ($g/m^2$) of the second coating liquid will also be later described in detail.

The second resin is an aqueous copolymer latex, which is prepared by the emulsion polymerization of a monomer mixture containing an acrylic-based monomer and a carboxylic acid-based monomer in the presence of a reactive emulsifier and a multifunctional silicone polymer and contains repeating units derived from the acrylic-based and carboxylic acid-based monomers in a proportion of 80% or more relative to the total repeating units, and the second resin has a solid content of 45.7 wt %, a glass transition temperature (Tg) of 22° C., and a minimum film forming temperature (METT) of 20° C. Preferably, the second resin is ACRYCOTE™ APC-0829 from APEC Inc., and may contain 45-47 wt % of an acrylic ester copolymer, 53-55 wt % of water, and 0.1 wt % of other components.

The second resin has a relatively higher glass transition temperature (Tg) than the first resin, preferably a glass transition temperature higher than a temperature in the manufacturing of paper cups, and thus the second resin has excellent block resistance. Therefore, the second resin can prevent the sticking between the base paper for paper cups and the mold at low temperatures, prevent the sticking between base papers of stacked paper cups or between stacked paper cups, and express the sealing performance at high temperatures, such as high-frequency sealing or heat sealing.

The formation of the second coating layer 33 by applying the second coating liquid containing such a second resin onto the first coating layer 31 can provide a base paper 1 for paper cups having excellent heat sealability, water resistance, oil resistance, and block resistance.

The second resin exhibits block resistance at 80-120° C., and as described above, the temperature at which the first resin exhibits heat sealability is higher than the temperature at which the second resin exhibits block resistance. Preferably, the second resin exhibits block resistance at 90-120° C., and more preferably approximately 100° C. in the sealing between a coated surface and a non-coated surface.

The second defoamer is used to prevent bubbling and remove bubbles, and preferably, the amount of the second defoamer added may be 0.002 parts by weight when the amount of the second resin is set to 1. More preferably, the first defoamer added to the first resin and the second defoamer added to the second resin may be in the same type. That is, the second defoamer is a silicone-based defoamer containing polydimethylsiloxane (PDMS) as a main raw material, produced by Sadhan Silichem Co., Ltd., and may be a white suspension containing a solid content of 38 wt % and a pH level of 7.0.

The silica is added to prevent surface stickiness, and the amount (part by weight) of silica added is preferably more than 0.06 parts by weight and less than 0.21 parts by weight relative to the second resin, and the derivation of such a range will be later described. The type of silica is not limited to any specific type, but is preferably 100% silicon dioxide ($SiO_2$), and may have a white powder form. More preferably, the silica may be SS-65B, which is micronized silica from S-CHEMTECH Co., Ltd., and may be configured of silicon dioxide and Silica, amorphous 100%.

The wetting agent is added to improve coating coverage. The wetting agent herein has a wide concept encompassing a leveling agent having a wetting effect. Since the agglomeration of coating liquids may occur due to a difference in surface tension when the second coating liquid is applied onto the first coating layer 31 having water resistance and oil resistance, the wetting agent is added so as to allow the second coating liquid to be uniformly applied onto the entire surface of the first coating layer 31, thereby improving flowability and flatness of the coating layers, leading to a coated surface with excellent coverage. The type of wetting agent is not limited, but preferably, the BYK-3410 product produced by BYK Inc., which is a yellowish brown liquid containing butanedioic acid, 2-sulfo-, 1,4-bis(2-ethylhexyl) ester, and sodium salt as main components and having a solid content of 50 wt %, may be used.

If the block resistance of a portion of the second coating layer 33 is lowered, heat sealing occurs between a paper cup under manufacture and the mold in the manufacturing of paper cups, and thus paper cups under manufacture, which should be separated from the mold and moved to the next process, may not move smoothly, and sticking may occur between stacked base papers and heat sticking may occur between stacked finished paper cups when the finished paper cups are stacked, so that such block resistance needs to be maintained at a certain level or higher. Therefore, the wetting agent is added to the second coating liquid, thereby preventing the block resistance of the second coating liquid from being lowered to a proper level or lower.

Hereinafter, the followings are to be investigated through specific experiments: whether a paper cup satisfies requirement characteristics, recyclability, and biodegradability (see Experiment 1); the heat sealability, moldability, and water leakage in an actual manufacturing process (see Example 2); the appropriate range of the coating amount of a first coating liquid (see Example 3); the appropriate range of the coating amount of a second coating liquid (see Example 4); the appropriate range of the amount of silica added in the preparation of a second coating liquid (see Example 5); and the appropriate range of the amount of a wetting agent added in the preparation of a second coating liquid (see Example 6). Methods used to measure experimental data are as follows.

Measurement Methods

1. Heat Sealability

As for heat sealability, the temperature at which heat sealing occurred was measured in order to evaluate the sealing between a coated surface and a coated surface and the sealing between a coated surface and a non-coated surface when paper cups were molded. The sealing was carried out using a heat sealing tester while the pressure was set to 100 KPa and the time was set to 1 second. When several samples were subjected to sealing while the temperature was raised at intervals of 5° C. with constant pressure and time and then the sealed portions were torn out by the application of force, the temperatures at which coated surfaces were completely torn out was recorded as data. The lower the temperature, the better the heat sealing between a coated surface and a coated surface (in the sealing of the bottom paper to the side paper in a paper cup), and the lower the temperature, the better the heat sealing between a coated surface and a non-coated surface (in the sealing of both ends of the side paper in a paper cup).

2. Block Resistance

As for block resistance, in order to evaluate the sticking occurring between a coated surface and the molding equipment in the molding of a paper cup, the temperature at which heat sealing occurred was measured. The sealing was carried out using a heat sealing tester while the pressure was set to 100 KPa and the time was set to 5 seconds. When several samples were subjected to sealing while the temperature was raised at intervals of 5° C. with constant pressure and time and the sealed portions were torn out by the application of force, the maximum temperatures at which coated surfaces were not torn out were recorded as data. As for the block resistance between a coated surface and a non-coated surface (between base papers or between a base paper and a mold), the occurrence of the sticking between the base papers or between the base paper and the mold was reduced as the measured temperature was higher, thereby evaluating excellent cup moldability.

3. Water Resistance

In order to evaluate the characteristics of water penetration through the surface of a paper, the Cobb size test was applied. Based on the TAPPI T 441 Cobb size test, a coated surface was in contact with water for a predetermined time and then the amount of water penetration was measured and evaluated. The amount of water was set to 100 mL and the contact time was based on 30 min, and the amount of water penetration was measured using hot water (90° C.) and cold water (1° C.) according to the final purpose. Preferably, water resistance to hot water may take precedence over water resistance to cold water. The measured value is the amount of water received through the surface of a paper, and thus the lower the value, the better the water resistance.

4. Recyclability

Assuming that a paper raw material was reused, a sample was dissociated, and the dissociated raw material was made into a hand-made paper, and the formation value of the made hand-made paper was recorded as data. The formation refers to how uniformly pulp fibers of a paper are distributed, and greatly affects the air permeation of a paper (degree to which a paper pass through air), opacity, and printing quality. The formation was measured by the TechPAP optical type meter, and the value measured by the formation meter is a formation value when the paper was again dissociated in water and made into a paper. A lower formation value may indicate excellent recyclability.

5. Biodegradability

In order to simulate the biodegradation in nature, a base paper was placed on a frame formed of a plastic and having four regions obtained by partitioning the space, and a frame was further placed on the base paper, and then the resulting structure was buried in a flower bed. Then, the change in morphology over time was observed for a portion of the base paper in contact with soil. When the base paper was degraded in a form similar to that of an ordinary paper, the base paper was assessed to be biodegradable in nature.

6. Cup Molding Test

In order to evaluate the possibility of mass production of paper cups in a typical cup molding machine, the workability, the heat sealing state of the molded cup, and water leakage were evaluated while ordinary operations were performed in the cup molding equipment using heat sealing and high-frequency sealing.

Experiment 1

Purpose: Investigation on whether paper cup satisfied requirement characteristics, recyclability, and biodegradability Method: Three types of acrylic-based copolymer resins were prepared.

A first resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the first resin having a solid content of 46.5 wt %, a glass transition temperature (Tg) of 3° C., and a minimum film forming temperature (METT) of 32° C.

A second resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the second resin having a solid content of 45.7 wt %, a glass transition temperature (Tg) of 22° C., and a minimum film forming temperature (METT) of 20° C.

A third resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the third resin having a solid content of 46.0 wt %, a glass transition temperature (Tg) of 10° C., and a minimum film forming temperature (METT) of 25° C.

The first, second, and third resins may represent a product having excellent heat sealability but poor block resistance, a product having excellent block resistance but poor heat sealability, and a product having intermediate heat sealability and block resistance, respectively.

Example 1-1

A first coating liquid was prepared by adding, to the prepared first resin, 0.002 parts by weight of a defoamer relative to the first resin. A second coating liquid was prepared by adding, to the second resin, 0.12 parts by weight of silica, 0.01 parts by weight of a wetting agent, and 0.002 parts by weight of a defoamer relative to the second resin. Through the coating liquids thus obtained, the first coating liquid of 12 g/m2 was applied onto a basic paper of 350 g/m2 to form a first coating layer, and the second coating liquid of 3 g/m2 was applied onto the first coating layer to form a second coating layer, thereby forming a double-coating layer on one surface of the basic paper.

Example 1-2

A basic paper of 250 g/m2 was used, and the same double-coating layer as in example 1-1 was formed on both surfaces of the basic paper.

Comparative Example 1-1

A coating liquid was prepared by adding, to the first resin, 0.002 parts by weight of a defoamer relative to the first resin. The coating liquid of 15 g/m2 was applied onto a basic paper of 350 g/m2 to form a single coating layer.

Comparative Example 1-2

A coating liquid was prepared by adding, to the second resin, 0.12 parts by weight of silica, 0.01 parts by weight of a wetting agent, and 0.002 parts by weight of a defoamer relative to the second resin. The coating liquid of 15 g/m2 was applied onto a basic paper of 350 g/m2 to form a single coating layer.

Comparative Example 1-3

A coating liquid was prepared by adding, to the third resin, 0.12 parts by weight of silica, 0.01 parts by weight of a wetting agent, and 0.002 parts by weight of a defoamer relative to the third resin. The coating liquid of 15 g/m2 was applied onto a basic paper of 350 g/m2 to form a single coating layer.

Comparative Example 1-4

Comparative Example 1-4 was a base paper coated with polyethylene (PE) currently manufactured as a commercial product, wherein the polyethylene of 30 g/m2 was coated on a basic paper of 300 g/m2.

Comparative Example 1-5

Comparative Example 1-5 was a base paper coated with polylactic acid (PLA) currently manufactured as a commercial product, wherein the polylactic acid (PLA) of 30 g/m2 was coated on a basic paper of 300 g/m2.

Results of Experiment 1

Referring to Table 1, Examples 1-1 and 1-2 having a double-coating layer showed numerical values within normal ranges in view of all of heat sealability between a coated surface and a coated surface, heat sealability between a coated surface and a non-coated surface, block resistance between a coated surface and a non-coated surface, and water resistance, which are characteristics required as a paper cup.

Figure 5:
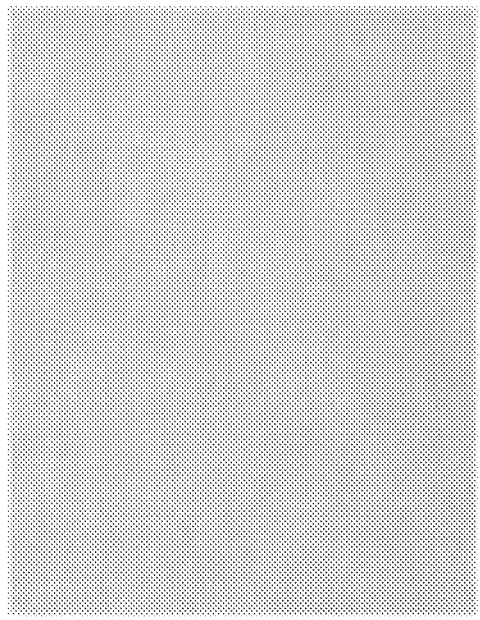
FIG. 5 shows a hand-made paper made after a sample regarding a base paper for paper cups according to an embodiment of the present disclosure is dissociated.

Above all, in Examples 1-1 and 1-2, the formation value indicating recyclability was within the normal range of 40 or less, and thus it was numerically validated that Examples 1-1 and 1-2 were highly recyclable. In addition, FIG. 5 shows a hand-made paper made after a sample regarding a base paper for paper cups according to Example 1-1 was dissociated. Referring to FIG. 5, the hand-made paper prepared from the base paper sample of the present disclosure showed uniformly distributed pulp fibers, validating excellent recyclability.

Figure 6:
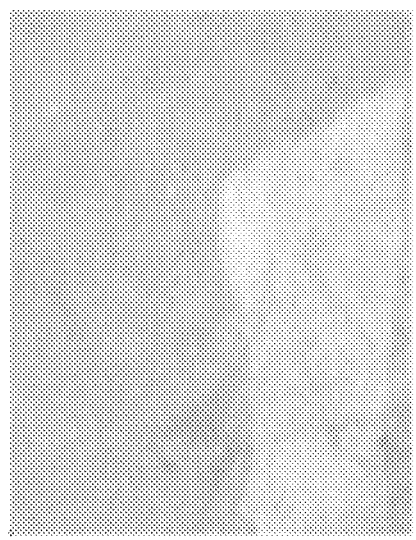
FIG. 6 shows a hand-made paper made after a sample regarding a polyethylene (PE)-coated base paper for paper cups is dissociated.
Figures 7, 8:
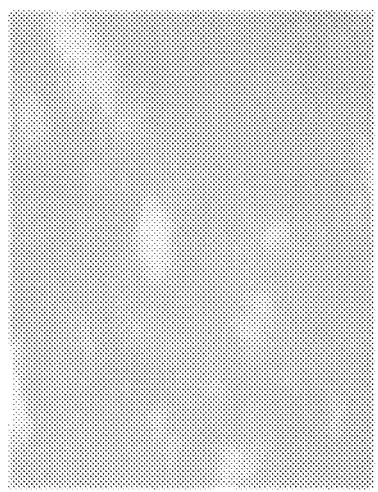
FIG. 7 shows a hand-made paper made after a sample regarding a polylactic acid (PLA)-coated base paper for paper cups is dissociated.
FIG. 8 shows biodegradability experimental results.

FIG. 6 shows a hand-made paper made after a sample regarding a polyethylene (PE)-coated base paper for paper cups (Comparative Example 1-4) was dissociated, and FIG. 7 shows a hand-made paper made after a sample regarding a polylactic acid (PLA)-coated base paper for paper cups (Comparative Example 1-5) was dissociated. In FIGS. 6 and 7, unlike FIG. 5, the coating film remains on the hand-made paper, verifying that pulp fibers were not uniformly distributed, and thus it was verified that polyethylene (PE)-coated paper cups and polylactic acid (PLA)-coated paper cups had poor recyclability.

FIG. 8 shows biodegradability experiment results, and showed the appearance over time when an ordinary paper, the base paper of Example 1-1, the base paper of Comparative Example 1-4, and the base paper of Comparative Example 1-5 were buried in a flower bed.

The non-coated ordinary paper was naturally degraded over time, and all the four regions in contact with soil were completely degraded after 6 months.

Example 1-1 showed no large change compared with the ordinary paper until 4 weeks, and was thereafter degraded, and after 6 months, all the four regions in contact with soil were completely degraded like in the ordinary paper.

In Comparative Example 1-4 with polyethylene (PE) coating, a coating film portion remained uncorroded even after 6 months, and in Comparative Example 1-5 with polylactic acid (PLA) coating, only a paper portion was

TABLE 1

| Item | Unit | Example 1-1 | Example 1-2 | Comparative Ex. 1-1 | Comparative Ex. 1-2 | Comparative Ex. 1-3 | Comparative Ex. 1-4 | Comparative Ex. 1-5 | Normal range |
|---|---|---|---|---|---|---|---|---|---|
| Heat sealability (Coated surface and Coated surface) | °C. | 115 | 115 | 80 | 150 | 145 | 135 | 145 | 145 or less |
| Heat sealability (Coated surface and Non-coated surface) | °C. | 130 | 130 | 90 | 175 | 160 | 140 | 150 | 150 or less |
| Block resistance (Coated surface and Non-coated surface) | °C. | 100 | 100 | 60 | 130 | 125 | 100 | 90 | 90 or more |
| Water resistance (30 min in hot water) | g/m$^2$ | 12 | 11 | 13 | 35 | 33 | 1 | 5 | 25 or less |
| Water resistance (30 min in cold water) | g/m$^2$ | 10 | 8 | 11 | 25 | 24 | 1 | 6 | 20 or less |
| Recyclability | — | 32 | 33 | 32 | 34 | 33 | Non-dissociable | Non-dissociable | 40 or less |
| Biodegradability | — | Degraded | Degraded | Degraded | Degraded | Degraded | Non-degradable | Non-degradable | Degradation | degraded and a coating film portion remained as it is without degradation even after 6 months.

Ultimately, conventional base papers for paper cups were not eco-friendly, but the base papers for paper cups of the present disclosure were validated to be a biodegradable eco-friendly material.

In Comparative Example 1-1 with the single coating layer formed of the first resin, the block resistance between a coated surface and a non-coated surface was measured to be lower than a normal range, and thus when paper cups were manufactured using the base paper of Comparative Example 1-1, the sticking occurs between the base paper and the mold, so that an operation may be stopped. In Comparative Example 1-2 with the single coating layer formed of the second resin, silica, wetting agent, and defoamer, the heat sealability between a coated surface and a coated surface and the heat sealability between a coated surface and a non-coated surface were significantly higher than normal ranges, so that the temperature required for heat sealing was excessively high.

In Comparative Example 1-3, the heat sealability between a coated surface and a non-coated surface was out of a normal range, and water resistance to hot water and water resistance to cold water failed to meet normal ranges.

Experiment 2

Purpose: Investigation on heat sealability, moldability, and water leakage in actual manufacturing process Method: In order to evaluate the possibility of mass production in a typical paper cup molding machine, a normal operation was performed through the cup molding equipment using heat sealing and high-frequency sealing. The paper cup molding machine was manufactured in-house, and as for operation conditions, 55 paper cups were produced per minute; high-frequency sealing with a current of 3 A was conducted on a side surface, and the temperature for bottom paper sealing was 340° C.

In Example 2-1 in Experiment 2, the molding operation was conducted in a commercial paper cup molding machine by using Example 1-1 in Experiment 1 as a side paper of paper cups and using Example 1-2 in Experiment 1 as a bottom paper of paper cups.

In Comparative Examples 2-1 to 2-3 in Experiment 2, a molding operation was conducted in a commercial paper cup molding machine by using Comparative Examples 1-1 to 1-3 in Experiment 1 as a side paper of paper cups and using Example 1-2 in Experiment 1 as a bottom paper of paper cups.

In Comparative Examples 2-4 and 2-5 in Experiment 2, a molding operation was conducted in a commercial paper cup molding machine in the same conditions as a commercial operation by using the base papers of Comparative Examples 1-4 and 1-5 in Experiment 1.

The present Experiment 2 was carried out to investigate heat sealability, moldability and water leakage in actual manufacturing processes, and a measurement method was employed in a different manner as the above-described measurement method.

As for heat sealability, the torn condition was evaluated by forcible separation of a sealed portion. The heat sealability was evaluated to be good when a paper surface was torn out, and bad when a sealed surface was torn out.

As for moldability 1, water is sprayed on the base paper after Thompson processing so that the base paper can be made flexible during a molding process, and in this case, the stacked base papers may stick together, causing difficulty in single-sheet feeding. In order to investigate such sticking, it was evaluated whether base papers were well separated one by one after Thompson processing and water spraying. The moldability 1 was evaluated to be good when the separation between the base papers was well made and bad when the sticking occurred between the base papers.

As for moldability 2, it was evaluated whether a base paper was normally separated from a mold without sticking to the mold during a molding process. The moldability 2 was evaluated to be good when the separation between the base paper and the mold was well made and the sticking occurred between the base paper and the mold occurred.

As for moldability 3, it was evaluated whether a normal operation was possible without stopping when the operation was performed at a rate of 60 ea/min for 1 hour. The moldability 3 was good when there was no stopping, and bad when there was stopping.

As for water leakage, it was investigated whether there was water leakage for 30 minutes when coffee heated to 90° C. was poured in a molded cup. The water leakage condition was good when there was no water leakage and bad when there was water leakage.

Results of Experiment 2

TABLE 2

| Item | Example 2-1 | Comparative Ex. 2-1 | Comparative Ex. 2-2 | Comparative Ex. 2-3 | Comparative Ex. 2-4 | Comparative Ex. 2-5 |
|---|---|---|---|---|---|---|
| Heat sealability | Good | Good | Bad | Bad | Good | Good |
| Moldability 1 | Good | Bad | Good | Good | Good | Good |
| Moldability 2 | Good | Bad | Good | Bad | Good | Good |
| Moldability 3 | Good | Bad | Good | Bad | Good | Good |
| Water leakage | Good | — | Bad | — | Good | Good |

Referring to Table 2, Example 2-1 in Experiment 2 showed good product quality in view of heat sealability, moldability, and water resistance like Comparative Examples 2-4 and 2-5, which were commercial products.

Whereas, Comparative Example 2-1 in Experiment 2, where the base paper of Comparative Example 1-1 in Experiment 1 was used as a side paper of a paper cup and the base paper of Example 1-2 in Experiment 1 was used as a bottom paper of the paper cup, showed good heat sealability, but also exhibited surface stickiness, and thus all types of moldability were poor, so that proper paper cups could not be produced. The reason was that as shown in Experiment 1, the base paper of Comparative Example 1-1 had significantly low block resistance, causing the sticking between a coated surface and a non-coated surface.

In Comparative Example 2-2 in Experiment 2 where the base paper of Comparative Example 1-2 in Experiment 1 was used as a side paper of a paper cup and the base paper of Example 1-2 in Experiment 1 was used as a bottom paper of the paper cup, a normal operation was possible, but when the sealed surface of the molded cup was forcibly separated, the sealed surface was torn out, causing poor heat sealability, and water leakage was observed in finished paper cups.

As a result of performing a paper cup manufacturing operation wherein the base paper of Comparative Example 1-3 where the heat sealability between a coated surface and a non-coated surface was out of the normal range and the water resistance to hot water and the water resistance to cold water failed to satisfy the normal ranges was used as a side paper of a paper cup and the base paper of Example 1-2 was used as a bottom paper of a paper cup, the heat sealability was bad and the overall workability was also bad similar to Comparative Example 2-1, and thus the manufacturing of paper cups was impossible.

In conclusion, as a result of performing a paper cup molding operation in a commercial paper cup molding machine by using Example 1-1 in Experiment 1 as a side surface of a paper cup and using Example 1-2 in Experiment 1 as a bottom paper of a paper cup, an eco-friendly paper cup with recyclability and biodegradability as well as basic characteristics required as a paper cup was produced.

When the base paper of Comparative Example 1-3 in Experiment 1 was used as a side surface of a paper cup, the workability was so poor that a paper cup molding operation could not be performed in the actual manufacturing of a paper cup, and thus even if the glass transition temperature (Tg) of the resin is at an intermediate level that satisfies heat sealability and block resistance, both heat sealability and moldability could not be satisfied by a single coating layer alone, and water resistance significantly deteriorated.

Experiment 3

Purpose: Investigation on appropriate range of coating amount of first coating liquid
Method: A first coating liquid was prepared by adding, to a first resin of an acrylic-based copolymer, 0.002 parts by weight of a defoamer relative to the first resin. The first resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the first resin having a solid content of 46.5 wt %, a glass transition temperature (Tg) of 3° C., and a minimum film forming temperature (METT) of 32° C.

A second coating liquid was prepared by adding, to a second resin of an acrylic-based copolymer, 0.12 parts by weight of silica, 0.01 parts by weight of a wetting agent, and 0.002 parts by weight of a defoamer, relative to the second resin. The second resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the second resin having a solid content of 45.7 wt %, a glass transition temperature (Tg) of 22° C., and a minimum film forming temperature (METT) of 20° C.

A first coating layer was formed on a basic paper of 350 g/m2 by adjusting the coating amount (g/m2) of the first coating liquid, and a second coating layer was formed by applying the second coating liquid of 3 g/m2 onto the first coating layer thus formed, thereby forming a double-coating layer on the basic paper. Through the above-described <measurement methods>, the base papers manufactured through the above process were measured for heat sealability between a coated surface and a coated surface, heat sealability between a coated surface and a non-coated surface, block resistance between a coated surface and a non-coated surface, water resistance to hot water, water resistance to cold water, recyclability, and biodegradability.
Results of Experiment 3

TABLE 3

| Item | Unit | Example 3-1 | Example 3-2 | Example 3-3 | Example 3-4 | Example 3-5 | Normal range |
|---|---|---|---|---|---|---|---|
| Coating amount of first coating liquid | g/m$^2$ | 7 | 8 | 12 | 15 | 18 | — |
| Heat sealability (Coated surface and Coated surface) | ° C. | 125 | 120 | 115 | 115 | 110 | 145 or less |
| Heat sealability (Coated surface and Non-coated surface) | ° C. | 135 | 130 | 130 | 130 | 125 | 150 or less |
| Block resistance (Coated surface and Non-coated surface) | ° C. | 105 | 105 | 100 | 95 | 95 | 90 or more |
| Water resistance (30 min in hot water) | g/m$^2$ | 32 | 20 | 12 | 11 | 11 | 25 or less |
| Water resistance (30 min in cold water) | g/m$^2$ | 26 | 16 | 10 | 10 | 10 | 20 or less |
| Recyclability | — | 32 | 32 | 32 | 32 | 33 | 40 or less |
| Biodegradability | — | Degraded | Degraded | Degraded | Degraded | Degraded | Degradation |

Referring to Table 3, considering Examples 3-2 to 3-5, when the coating amount of the first coating liquid was 8 g/m2 or more, all the heat sealability between a coated surface and a coated surface, heat sealability between a coated surface and a non-coated surface, block resistance between a coated surface and a non-coated surface, water resistance to hot water, water resistance to cold water, recyclability, and biodegradability were within normal ranges.

In Example 3-1 where the coating amount of the first coating liquid was 7 g/m2, the water resistance to hot water and the water resistance to cold water rapidly deteriorated. Therefore, it was preferable to configure the coating amount of the first coating liquid to exceed 7 g/m2.

When comparing Examples 3-4 and 3-5, it was preferable to configure the coating amount of the first coating liquid to be less than 18 g/m2 in light of the facts that the increase in coating amount little affect the quality of a base paper; Example 3-5 showed an increase trend in formation value for determining recyclability; and the price of a base paper increased as the coating amount of the first coating liquid increased.

Ultimately, it can be seen through the present Experiment 3 that the appropriate range of the coating amount (g/m2) of the first coating liquid is preferably more than 7 g/m2 and less than 18 g/m2.

Experiment 4

Purpose: Investigation on appropriate range of coating amount of second coating liquid
Method: A first coating liquid was prepared by adding, to a first resin of an acrylic-based copolymer, 0.002 parts by weight of a defoamer relative to the first resin. The first resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the first resin having a solid content of 46.5 wt %, a glass transition temperature (Tg) of 3° C., and a minimum film forming temperature (METT) of 32° C.

A second coating liquid was prepared by adding, to a second resin of an acrylic-based copolymer, 0.12 parts by weight of silica, 0.01 parts by weight of a wetting agent, and 0.002 parts by weight of a defoamer, relative to the second resin. The second resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the second resin having a solid content of 45.7 wt %, a glass transition temperature (Tg) of 22° C., and a minimum film forming temperature (METT) of 20° C.

A first coating layer was formed by applying a first coating liquid of 12 g/m2 on a basic paper of 350 g/m2 and a second coating layer was formed on the first coating layer by adjusting the coating amount (g/m2), thereby forming a double coating layer on the basic paper. Thereafter, through the above-described <measurement methods>, the base papers having different amounts of the second coating liquids were measured for heat sealability between a coated surface and a coated surface, heat sealability between a coated surface and a non-coated surface, block resistance between a coated surface and a non-coated surface, water resistance to hot water, water resistance to cold water, recyclability, and biodegradability. The results are shown in the following table.

Results of Experiment 4>

TABLE 4

| Item | Unit | Example 4-1 | Example 4-2 | Example 4-3 | Example 4-4 | Example 4-5 | Normal range |
|---|---|---|---|---|---|---|---|
| Coating amount of second coating liquid | g/m$^2$ | 1 | 2 | 3 | 4 | 5 | — |
| Heat sealability (Coated surface and Coated surface) | ° C. | 95 | 110 | 115 | 125 | 145 | 145 or less |
| Heat sealability (Coated surface and Non-coated surface) | ° C. | 100 | 125 | 130 | 140 | 155 | 150 or less |
| Block resistance (Coated surface and Non-coated surface) | ° C. | 80 | 95 | 100 | 105 | 110 | 90 or more |
| Water resistance (30 min in hot water) | g/m$^2$ | 14 | 14 | 12 | 12 | 11 | 25 or less |
| Water resistance (30 min in cold water) | g/m$^2$ | 11 | 10 | 10 | 10 | 10 | 20 or less |
| Recyclability | — | 32 | 34 | 32 | 32 | 36 | 40 or less |
| Biodegradability | — | Degraded | Degraded | Degraded | Degraded | Degraded | Degradation |

Referring to Table 4, considering Examples 4-2 to 4-4, when the coating amount of the second coating liquid was 2 g/m$^2$ or more, all the heat sealability between a coated surface and a coated surface, heat sealability between a coated surface and a non-coated surface, block resistance between a coated surface and a non-coated surface, water resistance to hot water, water resistance to cold water, recyclability, and biodegradability were within normal ranges. In Example 4-1 where the coating amount of the second coating liquid was 1 g/m$^2$, the block resistance between a coated surface and a non-coated surface water rapidly deteriorated. Therefore, it was preferable to configure the coating amount of the second coating liquid to exceed 1 g/m$^2$.

In Example 4-5 wherein the coating amount of the second coating liquid was 5 g/m$^2$, the heat sealability between a coated surface and a non-coated surface was greatly out of a normal range, and therefore, it was preferable to configure the coating amount of the second coating liquid to be less than 5 g/m$^2$.

Therefore, it was preferable to configure the coating amount (g/m$^2$) of the second coating liquid to be more than 1 g/m$^2$ and less than 5 g/m$^2$.

Experiment 5

Purpose: Investigation on appropriate range of amount of silica added in preparation of second coating liquid
Method: A first coating layer was formed by applying a first coating liquid of 12 g/m$^2$ on a basic paper of 350 g/m$^2$ and a second coating layer was formed by applying a second coating liquid of 3 g/m$^2$ on the first coating layer, thereby forming a double-coating layer on the basic paper.

A first coating liquid was prepared by adding, to a first resin of an acrylic-based copolymer, 0.002 parts by weight of a defoamer relative to the first resin. The first resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the first resin having a solid content of 46.5 wt %, a glass transition temperature (Tg) of 3° C., and a minimum film forming temperature (METT) of 32° C.

A plurality of second coating liquids were prepared by adding, to a second resin of an acrylic copolymer, 0.01 parts by weight of a wetting agent, 0.002 parts by weight of a defoamer, and varying amounts of silica, relative to the second resin. The second resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the second resin having a solid content of 45.7 wt %, a glass transition temperature (Tg) of 22° C., and a minimum film forming temperature (METT) of 20° C.

Through the above-described <measurement methods>, the base papers for paper cups, manufactured by adding varying amounts of silica, were measured for heat sealability between a coated surface and a coated surface, heat sealability between a coated surface and a non-coated surface, block resistance between a coated surface and a non-coated surface, water resistance to hot water, water resistance to cold water, recyclability, and biodegradability.

Results of Experiment 5

However, in Example 5-4 where the amount of silica added was 0.20 parts by weight, all the heat sealability between a coated surface and a coated surface, heat sealability between a coated surface and a non-coated surface, block resistance between a coated surface and a non-coated surface, water resistance to hot water, water resistance to cold water, recyclability, and biodegradability were within normal ranges, but in Example 5-5 where the amount of silica added was 0.21 parts by weight, the heat sealability between a coated surface and a coated surface, heat sealability between a coated surface and a non-coated surface, water resistance to hot water, and water resistance to cold water were out of normal ranges.

Therefore, it can be seen through the present experiment that the amount (part by weight) of silica was preferably more than 0.05 parts by weight and less than 0.21 parts by weight relative to the second resin.

Experiment 6

Purpose: Investigation on appropriate range of amount of wetting agent added in preparation of second coating liquid Method: A first coating layer was formed by applying a first coating liquid of 12 g/m² on a basic paper of 350 g/m² and a second coating layer was formed by applying a second coating liquid of 3 g/m² on the first coating layer, thereby manufacturing a base paper for paper cups, having a double-coating layer.

A first coating liquid was prepared by adding, to a first resin of an acrylic-based copolymer, 0.002 parts by weight of a defoamer relative to the first resin. The first resin was an aqueous copolymer latex, which was prepared by the emulsion polymerization of a monomer mixture containing an acrylic-based monomer and a carboxylic acid-based

TABLE 5

| Item | Unit | Example 5-1 | Example 5-2 | Example 5-3 | Example 5-4 | Example 5-5 | Normal range |
|---|---|---|---|---|---|---|---|
| Amount of silica added | Part by weight (Relative to second resin2) | 0.05 | 0.06 | 0.12 | 0.20 | 0.21 | — |
| Heat sealability (Coated surface and Coated surface) | ° C. | 110 | 110 | 115 | 140 | 150 | 145 or less |
| Heat sealability (Coated surface and Non-coated surface) | ° C. | 125 | 125 | 130 | 150 | 155 | 150 or less |
| Block resistance (Coated surface and Non-coated surface) | ° C. | 85 | 90 | 100 | 110 | 125 | 90 or more |
| Water resistance (30 min in hot water) | g/m² | 12 | 11 | 12 | 18 | 28 | 25 or less |
| Water resistance (30 min in cold water) | g/m² | 11 | 10 | 10 | 13 | 21 | 20 or less |
| Recyclability | — | 32 | 33 | 32 | 32 | 33 | 40 or less |
| Biodegradability | — | Degraded | Degraded | Degraded | Degraded | Degraded | Degradation |

Referring to Examples 5-1 to 5-5 on Table 5, Example 5-1 where the amount of silica added was 0.05 parts by weight relative to the second resin showed a rapid deterioration in block resistance between a coated surface and a non-coated surface, and Example 5-2 where the amount of silica added was 0.06 parts by weight relative to the second resin showed a normal range of block resistance between a coated surface and a non-coated surface. Therefore, the amount of silica added in the preparation of the second coating liquid was preferably more than 0.05 parts by weight when the amount of the second resin was set to 1.

monomer in the presence of a reactive emulsifier and a multifunctional silicone polymer and contained repeating units derived from the acrylic-based and carboxylic acid-based monomers in a proportion of 80% or more relative to the total repeating units, the first resin having a solid content of 46.5 wt %, a glass transition temperature (Tg) of 3° C., and a minimum film forming temperature (METT) of 32° C.

A plurality of second coating liquids were prepared by adding, to a second resin of an acrylic copolymer, 0.12 parts by weight of silica, 0.002 parts by weight of a defoamer, and varying amounts of a wetting agent, relative to the second resin. The second resin was an aqueous copolymer latex, which was prepared by the emulsion polymerization of a monomer mixture containing an acrylic-based monomer and a carboxylic acid-based monomer in the presence of a reactive emulsifier and a multifunctional silicone polymer and contained repeating units derived from the acrylic-based and carboxylic acid-based monomers in a proportion of 80% or more relative to the total repeating units, the second resin having a solid content of 45.7 wt %, a glass transition temperature (Tg) of 22° C., and a minimum film forming temperature (METT) of 20° C.

Through the above-described <measurement methods>, the base papers for paper cups, manufactured by adding varying amounts of a wetting agent, were measured for heat sealability between a coated surface and a coated surface, heat sealability between a coated surface and a non-coated surface, block resistance between a coated surface and a non-coated surface, water resistance to hot water, water resistance to cold water, recyclability, and biodegradability. The results are as follows.

Results of Experiment 6

TABLE 6

| Item | Unit | Example 6-1 | Example 6-2 | Example 6-3 | Example 6-4 | Example 6-5 | Normal range |
|---|---|---|---|---|---|---|---|
| Amount of wetting agent added | Part by weight (Relative to second resin) | 0 | 0.005 | 0.010 | 0.015 | 0.020 | — |
| Heat sealability (Coated surface and Coated surface) | ° C. | 110 | 115 | 115 | 115 | 115 | 145 or less |
| Heat sealability (Coated surface and Non-coated surface) | ° C. | 125 | 130 | 130 | 130 | 130 | 150 or less |
| Block resistance (Coated surface and Non-coated surface) | ° C. | 80 | 90 | 100 | 100 | 100 | 90 or more |
| Water resistance (30 min in hot water) | g/m$^2$ | 18 | 14 | 12 | 12 | 13 | 25 or less |
| Water resistance (30 min in cold water) | g/m$^2$ | 15 | 12 | 10 | 10 | 11 | 20 or less |
| Recyclability | — | 34 | 32 | 32 | 32 | 33 | 40 or less |
| Biodegradability | — | Degraded | Degraded | Degraded | Degraded | Degraded | Degradation |

Referring to Examples 6-1 to 6-5 on Table 6, Example 6-1 where the wetting agent was not added relative to the second resin showed a great deterioration in block resistance between a coated surface and a non-coated surface Example 6-2 where 0.005 parts by weight of the wetting agent was added showed a normal range of block resistance between a coated surface and a non-coated surface. Therefore, it can be seen that the addition of the wetting agent is needed to increase the bloc resistance between a coated surface and a non-coated surface.

It was however verified through the experiments that the production cost of a base paper for paper cups increased as the amount of the wetting agent added increased, and Example 6-5 where the amount of the wetting agent added was 0.02 parts by weight showed deterioration trends in water resistance in hot water and recyclability although the water resistance and recyclability were within normal ranges. Therefore, it was preferable to configure the amount of the wetting agent added to be less than 0.02 parts by weight.

Therefore, the amount (part by weight) of the wetting agent was preferably more than 0 parts by weight and less than 0.02 parts by weight relative to the second resin.

Figure 9:
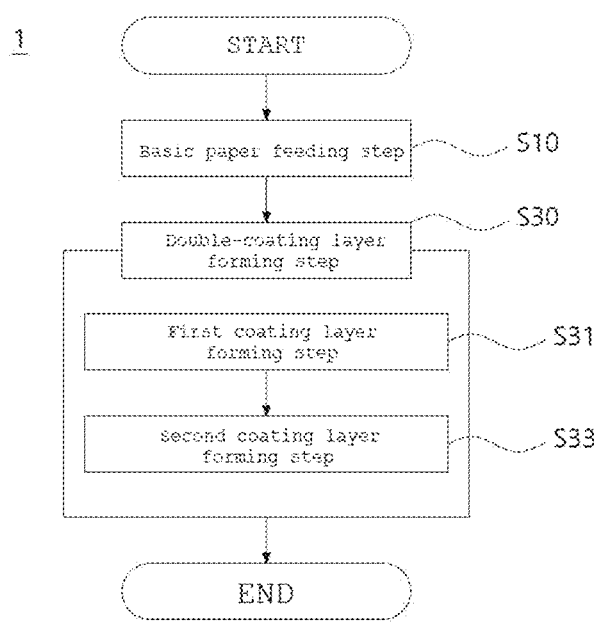
FIG. 9 shows a method for manufacturing a base paper for eco-friendly paper cups according to one embodiment of the present disclosure.

FIG. 9 shows a method for manufacturing a base paper for eco-friendly paper cups S1 according to an embodiment of the present disclosure. Referring to FIG. 9, the method for manufacturing for a base paper for eco-friendly paper cups is directed to a method for manufacturing a base paper for eco-friendly paper cups, which has excellent heat sealability, water resistance, and block resistance, facilitates recycling, and is biodegradable in nature. The manufacturing method includes a basic paper supplying step S10 and a double-coating layer forming step S30.

The basic paper supplying step 10 is a step of supplying, by a paper maker, a basic paper 10. The basic paper 10 is a basic paper on which a double-coating layer 30 is formed, and may be regarded as a collective term of all types of papers that can be used in the manufacturing of paper cups. The basic paper 10 is not limited to any particular type of paper, but the basic paper 10 has preferably a basis weight in the range of 200-350 g/m2 and may be a KAce PNC product by Hankuk Paper Co., Ltd., which is manufactured using 100% natural pulp without fluorescent materials. The paper maker may be regarded as a wide concept encompassing not only directly producing the basic papers 10 and continuously supplying the basic papers 10 to a coater (on-machine) but also supplying the coater with the basic paper 10 delivered while being wound on a reel (off-machine). As for the production of the basic paper 10 by the paper maker, for example, primary dehydration is conducted by gravity, and when a web having a moisture content of 50-60% is formed by a press, the web is again dried to drop the moisture content to a level of 2-7%. Thereafter, the dried web was coated with a starch-based size liquid in a size press, and the coated web is again dried in a dryer to have a moisture content of 2-10%. Ultimately, the thickness of the paper was adjusted and the surface of the paper was smoothened, thereby forming the basic paper 10.

The double-coating layer forming step 30 is a step of forming, by a coater, a double-coating layer 30 on the basic paper after the basic paper supplying step S10. The coater forms the double-coating layer on the basic paper 10, supplied from the paper maker through the basic paper supplying step S10. The coater includes not only a coater for paper making but also a gravure coater, a flexo coater, a roll-to-roll coater, and the like, which are off-machine type coaters, but the coater is not limited to any particular coater. The double-coating layer 30 may be formed on one surface of the basic paper 10 or may be formed on both surfaces of the basic paper 10. The double-coating layer forming step S30 includes a first coating layer forming step S31 and a second coating layer forming step S33.

Figure 10:
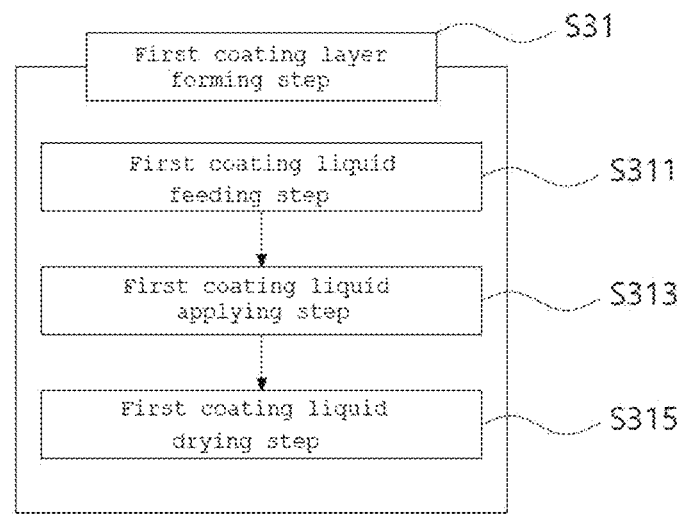
FIG. 10 shows a first coating layer forming step in FIG. 9.

The first coating layer forming step S31 is a step of forming, by a first coating unit, a first coating layer 31 on one surface of the basic paper 10. The first coater may include: a first coating liquid supplying unit for supplying a first coating liquid; a first coating head unit for applying the first coating liquid onto the basic paper 10; and a first drying unit for drying the applied first coating liquid. As described above, the first coating layer 31 is a layer which is formed of the first coating liquid containing a first resin and a first defoamer, and may be regarded as a portion which allows a base paper for paper cups to express excellent heat sealability, water resistance, and oil resistance. FIG. 10 shows the first coating layer forming step S31 in FIG. 9. The first coating layer forming step S31 includes a first coating liquid supplying step S311, a first coating liquid applying step S313, and a first coating liquid drying step S315.

The first coating liquid supplying step S311 is a step of supplying, by the first coating liquid supplying unit, a first coating liquid to be applied onto the basic paper 10. The first coating liquid includes a first resin and a first defoamer, and as described above, the first resin has a glass transition temperature lower than a temperature in the manufacturing of paper cups and thus gives heat sealability and water resistance. Specifically, the first resin is an aqueous copolymer latex, which is prepared by the emulsion polymerization of a monomer mixture containing an acrylic-based monomer and a carboxylic acid-based monomer in the presence of a reactive emulsifier and a multifunctional silicone polymer and contains repeating units derived from the acrylic-based and carboxylic acid-based monomers in a proportion of 80% or more relative to the total repeating units, and the first resin may have a solid content of 46.5 wt %, a glass transition temperature (Tg) of 3° C., and a minimum film forming temperature (METT) of 32° C. The first deformer is preferably added in 0.002 parts by weight relative to the first resin.

The first coating liquid applying step S313 is a step of applying, by the first coating head unit, a first coating liquid onto the basic paper 10, after the first coating liquid feeding step S311. As can be seen from the above-described experiments, the coating amount (g/m$^2$) of the first coating liquid is preferably configured to be more than 7 g/m$^2$ to less than 18 g/m$^2$. The types of coating are a blade coater, a rod coater, an air knife coater, a curtain coater, and the like, and the types suitable for eco-friendly coating are in the order of an air knife coater, a rod coater, and a blade coater. However, in the present disclosure, the coating manner of the first coating head unit is not limited to any particular type, and any of a variety of methods can be used.

The first coating liquid drying step S315 is a step of drying, by the first drying unit, the first coating liquid applied onto the basic paper 10, after the first coating liquid applying step S313. The first drying unit may be an IR type heater, and is regarded as a concept encompassing a scarf dryer, a drum dryer, and the like used for a general-purpose coater. It may be preferable that the first coating liquid is applied onto one surface and dried and then the first coating liquid is applied onto the other surface and dried when the first coating layer 31 is formed on both surfaces of the basic paper 10.

Figure 11:
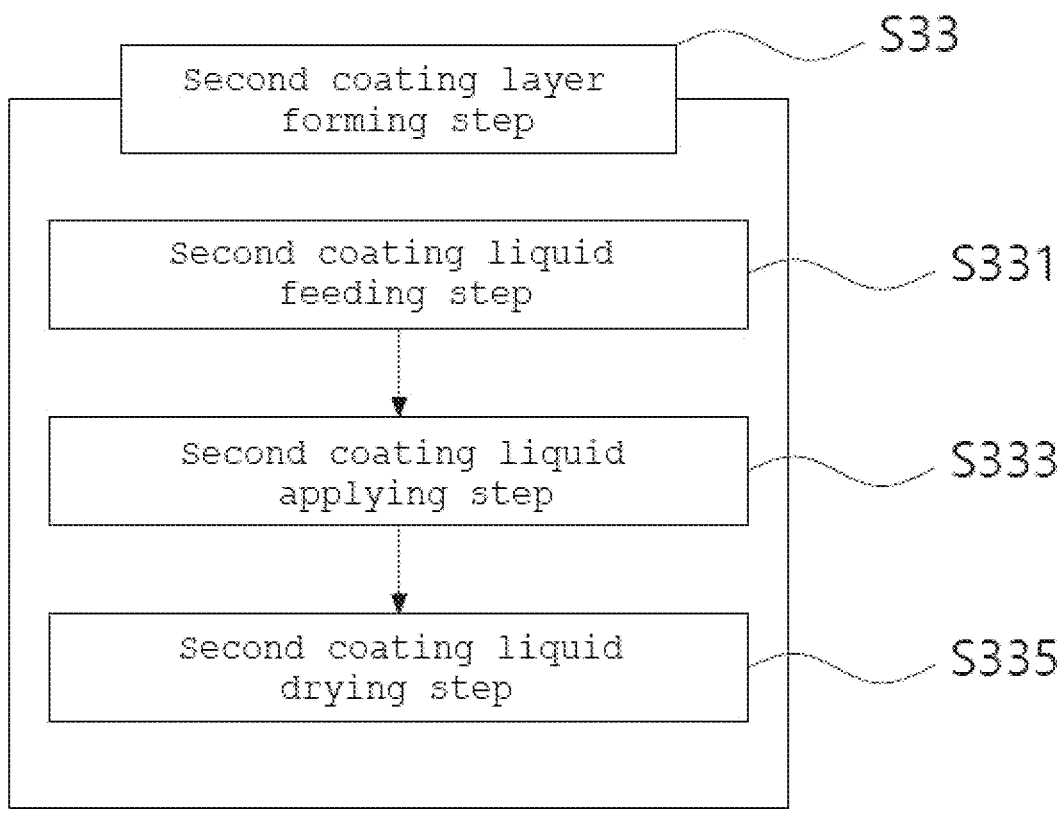
FIG. 11 shows a second coating layer forming step in FIG. 9.

The second coating layer forming step S33 is a step of forming, by a second coating unit, a second coating layer 33 on the first coating layer 31, after the first coating layer forming step S31. The second coater unit may include: a second coating liquid supplying unit for supplying a second coating liquid; a second coating head unit for applying the second coating liquid onto the basic paper 10; and a second drying unit for drying the applied second coating liquid. As described above, the second coating layer 33 is a layer which is formed of the second coating liquid containing a second resin, a second defoamer, silica, and a wetting agent, and may be regarded as a portion which allows a base paper for paper cups to express excellent block resistance. FIG. 11 shows the second coating layer forming step S33 in FIG. 9. Referring to FIG. 11, the second coating layer forming step S33 includes a second coating liquid supplying step S331, a second coating liquid applying step S333, and a second coating liquid drying step S335.

The second coating liquid supplying step S331 is a step of supplying, by the second coating liquid supplying unit, a second coating liquid to be applied onto the first coating layer 10, and the second coating liquid contains a second resin, a second defoamer, silica, and a wetting agent. The second resin has a glass transition temperature higher than a temperature in the manufacturing of paper cups and thus gives excellent block resistance. Preferably, the second resin is an aqueous copolymer latex, which is prepared by the emulsion polymerization of a monomer mixture containing an acrylic-based monomer and a carboxylic acid-based monomer in the presence of a reactive emulsifier and a multifunctional silicone polymer and contains repeating units derived from the acrylic-based and carboxylic acid-based monomers in a proportion of 80% or more relative to the total repeating units, and the second resin may have a solid content of 45.7 wt %, a glass transition temperature (Tg) of 22° C., and a minimum film forming temperature (METT) of 20° C. The second defoamer is preferably added in 0.002 parts by weight relative to the second resin. As can be seen from the above-described experimental results, the amount (part by weight) of silica added may be configured to be more than 0.05 parts by weight and less than 0.21 parts by weight relative to the second resin, and the amount of the wetting agent may be configured to be more than 0 parts by weight and less than 0.02 parts by weight relative to the second resin.

The second coating liquid applying step S333 is a step of applying, by the second coating head unit, a second coating liquid onto the first coating layer 31, after the second coating liquid supplying step S331. As described above, the amount (g/m2) of the second coating liquid coated is configured to be more than 1 g/m$^2$ and less than 5 g g/m$^2$. The types of coating are a blade coater, a rod coater, an air knife coater, a curtain coater, and the like, and the types suitable for eco-friendly coating are in the order of an air knife coater, a rod coater, and a blade coater, as described above. However, the coating type by the second coating head is not also limited to any particular type, and encompasses all the various types.

The second coating liquid drying step S335 is a step of drying, by the second drying unit, the second coating liquid applied onto the first coating layer 31, after the second coating liquid applying step S333. Like the first drying unit, the second drying unit may also be an IR type heater, and may include all of a scarf dryer, a drum dryer, and the like used for a general-purpose coater. On the premise that the first coating layer 31 is formed on both surfaces of the basic paper 10, it is preferable that, when the second coating layer 33 are formed, the second coating liquid is coated on the first coating layer 31 corresponding to one surface and dried and then the second coating liquid is coated on the first coating layer 31 corresponding to the other surface and then dried.

Figure 12:
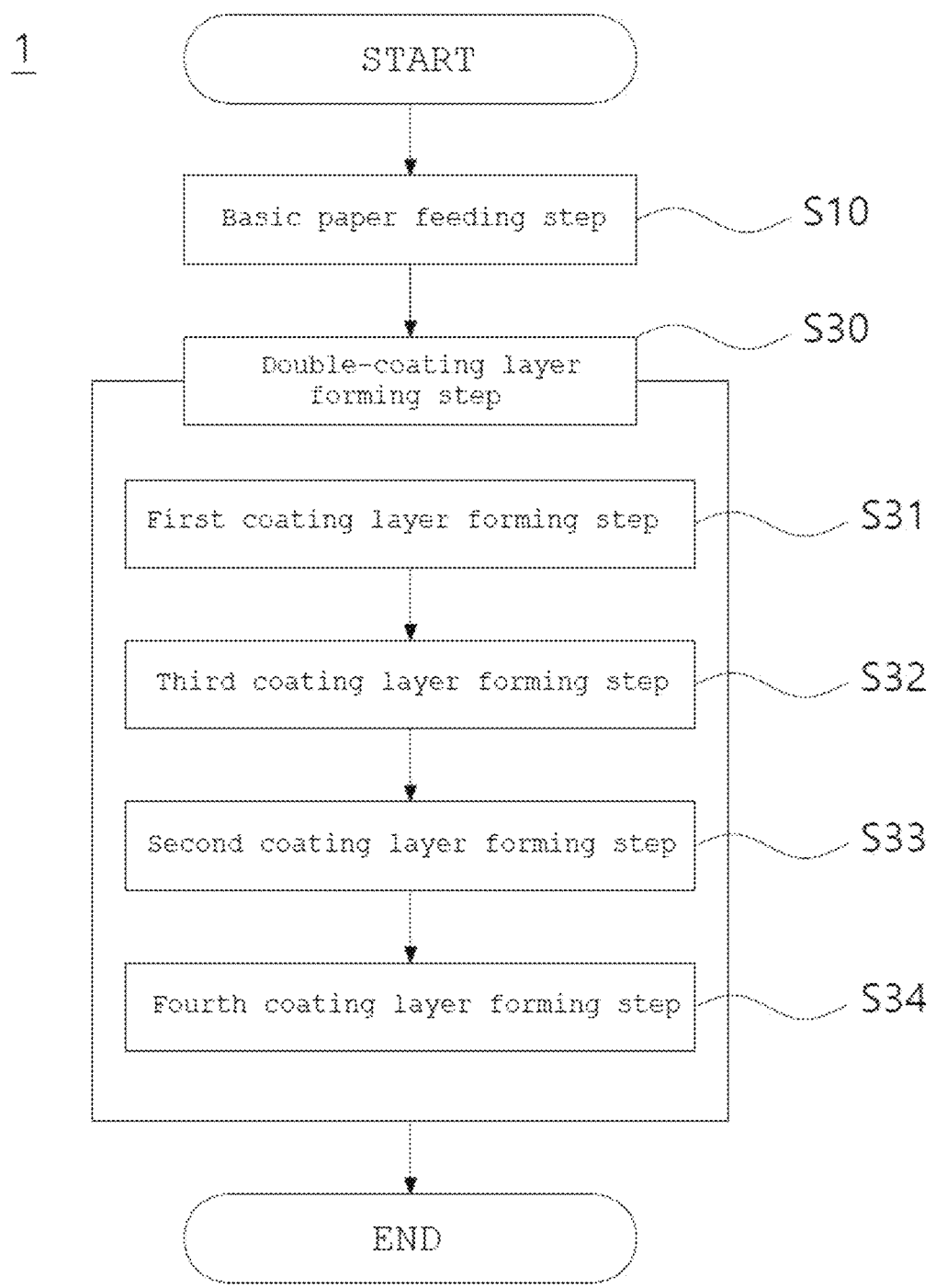
FIG. 12 shows a method for manufacturing a base paper for eco-friendly paper cups according to another embodiment of the present disclosure.
Figure 13:
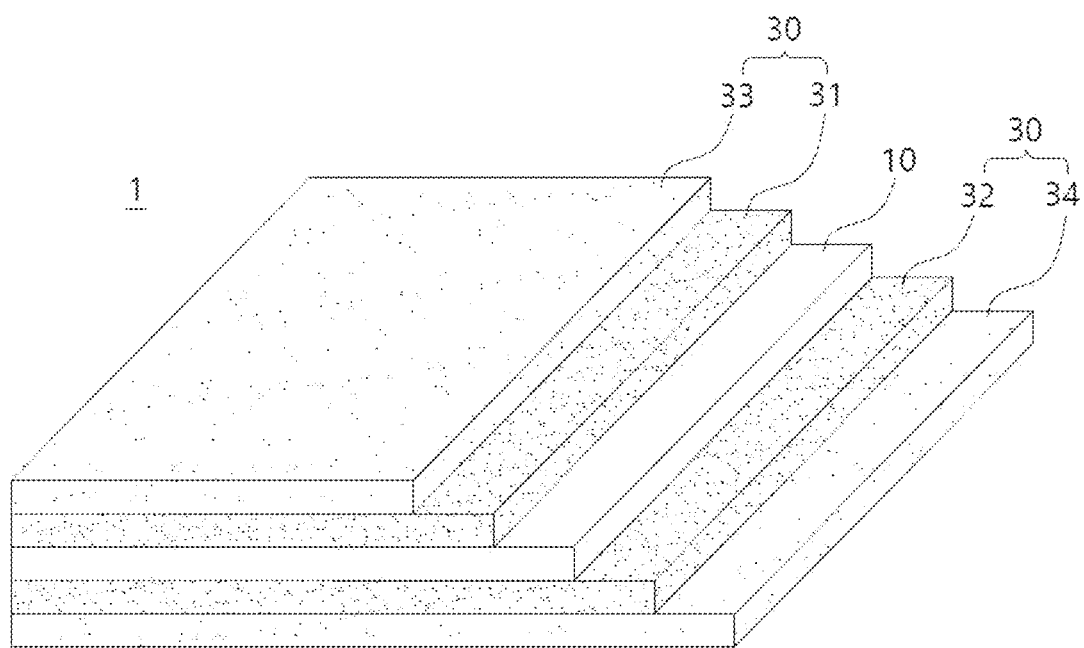
FIG. 13 shows a base paper for paper cups manufactured by the method in FIG. 12.

FIG. 12 shows a method for manufacturing a base paper for eco-friendly paper cups according to another embodiment of the present disclosure, and FIG. 13 shows a base paper for paper cups manufactured by the method in FIG. 12. In the above-described example in FIG. 9, the double-coating layer 30 is formed on only one surface of the basic paper 10, but in the example in FIGS. 12 and 13, the double-coating layer 30 is formed on both surfaces of the basic paper 10. Also in this case, the double coating layers 30 are formed on one surface and the other surface of the basic paper 10, respectively.

The bottom paper of a paper cup is required to have higher water resistance and oil resistance, and thus the side paper of a paper cup is formed of a base paper having a double-coating layer 30 formed on one surface thereof and the bottom paper of a paper cup is formed of a base paper having a double-coating layer 30 formed on both surfaces thereof, thereby realizing excellent performance of a paper cup without greatly increasing production costs of the base paper of a paper cup.

In Example in FIGS. 12 and 13 unlike the example in FIG. 9, a third coating layer forming step S32 is further added between the first coating layer forming step S31 and the second coating layer forming step S33, and a fourth coating layer forming step S34 is added after the second coating layer forming step S33.

If the first coating layer forming step S31 is a step of forming, by the first coater, the first coating layer 31 on one surface of the basic paper 10, the third coating layer forming step S32 may be a step of forming, by a third coater, the third coating layer 32, which is the same as the first coating layer 30, on the other surface of the basic paper 10. That is, the coating layers formed by the first coating layer forming step S31 and the third coating layer forming step S32 are the same as each other, and differ only in the side of the basic paper 10 on which the coating layer is formed. Therefore, the above description of the first coating layer 31 can be applied to the third coating layer 32 as it is, and the description of the first coating layer forming step S31 can also be applied to the third coating layer forming step S32 as it is.

When the first coating layer 31 and the third coating layer 32 are formed on both surfaces of the basic paper 10, respectively, the second coating layer forming step S32 is performed after the third coating layer forming step S32, and thus the second coating layer 33 is formed on the first coating layer 31 by the second coater. After the second coating layer forming step S33, a fourth coating layer forming step S33 of forming, by a fourth coater, a fourth coating layer 34, which is the same as the second coating layer 33, on the third coating layer 32 is performed.

The second coating layer forming step S33 differs from the fourth layer forming step S34 only in that the second coating layer 33 is formed on the first coating layer 31 in the second coating layer forming step S33 and the fourth coating layer 34 is formed on the third coating layer 32, and thus the second coating layer 33 is the same as the fourth coating layer 34. Therefore, the above description of the second coating layer 33 can be applied to the fourth coating layer 34 as it is, and the description of the second coating layer forming step S33 can also be applied to the fourth coating layer forming step S34 as it is.

The above detailed description illustrates an example of the present disclosure. In addition, the above description relates to a preferred embodiment of the present disclosure, and the present disclosure may be used in various other combinations, modifications, and environments. That is, the present disclosure may be changed or modified within the scope of the concept of the disclosure disclosed in the present specification, the scope equivalent to the disclosed content, and/or the scope or knowledge of the art. The above-described embodiment illustrates the best mode for carrying out the technical idea of the present disclosure, and various modifications required for a specific application field and usage of the present disclosure are possible. Therefore, the detailed description of the disclosure above is not intended to limit the present disclosure to the disclosed embodiment. Further, the appended claims must be construed to encompass other embodiments.

What is claimed is:

1. A base paper for eco-friendly paper cups, comprising:
a basic paper; and
a double-coating layer formed on the basic paper,
wherein the base paper for eco-friendly paper cups has heat sealability, water resistance, and block resistance, facilitates recycling, and is biodegradable in nature,
wherein the double-coating layer comprises:
a first coating layer formed of a first coating liquid applied onto the basic paper; and
a second coating layer formed of a second coating liquid applied onto the first coating layer,
wherein the double-coating layer is given heat sealability and water resistance by the first coating layer and given block resistance by the second coating layer,
wherein the second coating liquid comprises a second resin for giving block resistance, a second defoamer for removing bubbles, silica for preventing surface stickiness, and a wetting agent for improving coating coverage,
wherein the second resin has a glass transition temperature higher than a temperature during the manufacturing of paper cups and thus gives block resistance to the base paper for eco-friendly paper cups, and
wherein the second resin is an aqueous copolymer latex, which is prepared by the emulsion polymerization of a monomer mixture containing an acrylic-based monomer and a carboxylic acid-based monomer in the presence of a reactive emulsifier and a multifunctional silicone polymer and contains repeating units derived from the acrylic-based and carboxylic acid-based monomers in a proportion of 80% or more relative to the total repeating units, the second resin having a solid content of 45.7 wt %, a glass transition temperature (Tq) of 22° C., and a minimum film forming temperature (METT) of 20° C.

2. The base paper for eco-friendly paper cups of claim 1, wherein the second deformer is added in 0.002 parts by weight relative to the second resin.

3. The base paper for eco-friendly paper cups of claim 1, wherein the silica is added in more than 0.05 parts by weight and less than 0.21 parts by weight relative to the second resin.

4. The base paper for eco-friendly paper cups of claim 1, wherein the wetting agent is added in more than 0 parts by weight and less than 0.02 parts by weight relative to the second resin.

5. The base paper for eco-friendly paper cups of claim 1, wherein the coating amount (g/m$^2$) of the second coating liquid is more than 1 g/m$^2$ and less than 5 g g/m$^2$.

6. The base paper for eco-friendly paper cups of claim 1, wherein the double-coating layer is formed on one surface of the basic paper.

7. The base paper for eco-friendly paper cups of claim 1, wherein the double-coating layer is formed on both surfaces of the basic paper.

8. The base paper for eco-friendly paper cups of claim 1, wherein the first coating liquid comprises a first resin for giving heat sealability and water resistance and a first defoamer for removing bubbles.

9. The base paper for eco-friendly paper cups of claim 8, wherein the first resin has a glass transition temperature lower than a temperature during the manufacturing of paper cups and thus gives heat sealability and water resistance to the base paper for paper cups.

10. The base paper for eco-friendly paper cups of claim 9, wherein the first resin is an aqueous copolymer latex, which is prepared by the emulsion polymerization of a monomer mixture containing an acrylic-based monomer and a carboxylic acid-based monomer in the presence of a reactive emulsifier and a multifunctional silicone polymer and contains repeating units derived from the acrylic-based and carboxylic acid-based monomers in a proportion of 80% or more relative to the total repeating units, the first resin having a solid content of 46.5 wt %, a glass transition temperature (Tg) of 3° C., and a minimum film forming temperature (METT) of 32° C.

11. The base paper for eco-friendly paper cups of claim 8, wherein the first deformer is added in 0.002 parts by weight relative to the first resin.

12. The base paper for eco-friendly paper cups of claim 8, wherein the coating amount (g/m$^2$) of the first coating liquid is more than 7 g/m$^2$ and less than 18 g/m$^2$.

13. The base paper for eco-friendly paper cups of claim 1, wherein the first resin of the first coating layer exhibits heat sealability at 80-150° C. and the second resin of the second coating layer exhibits block resistance at 80-120° C.

14. The base paper for eco-friendly paper cups of claim 13, wherein the temperature at which the first resin exhibits heat sealability is higher than the temperature at which the second resin exhibits block resistance.

15. The base paper for eco-friendly paper cups of claim 14, wherein the first resin exhibits heat sealability at 80-145° C. in the sealing between a coated surface and a coated surface.

16. The base paper for eco-friendly paper cups of claim 15, wherein the first resin exhibits heat sealability at approximately 115° C.

17. The base paper for eco-friendly paper cups of claim 14, wherein the first resin exhibits heat sealability at 90-150° C. in the sealing between a coated surface and a non-coated surface.

18. The base paper for eco-friendly paper cups of claim 17, wherein the first resin exhibits heat sealability at approximately 130° C.

19. The base paper for eco-friendly paper cups of claim 14, wherein the second resin exhibits block resistance at 90-120° C. in the sealing between a coated surface and a non-coated surface.

20. The base paper for eco-friendly paper cups of claim 19, wherein the second resin exhibits block resistance at approximately 100° C.

* * * * *